May 19, 1931. A. C. SLADKY 1,806,184
RECEPTACLE ATTACHMENT
Filed July 19, 1929
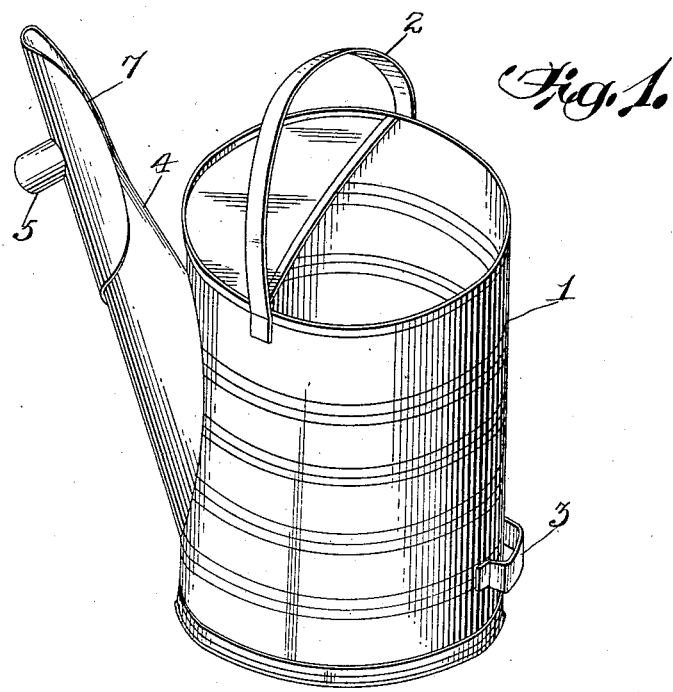
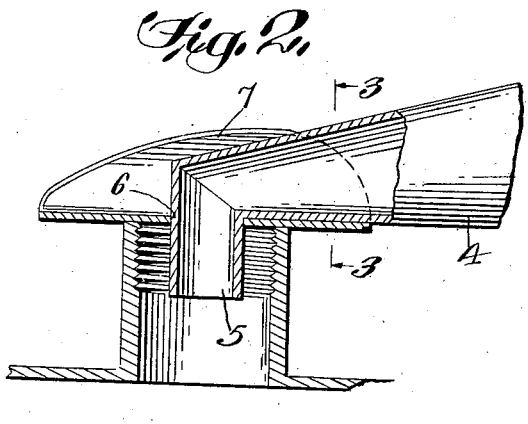
Inventor
A. C. Sladky
By
Attorneys Patented May 19, 1931

1,806,184

UNITED STATES PATENT OFFICE

ALEXANDER C. SLADKY, OF MILWAUKEE, WISCONSIN, ASSIGNOR TO NATIONAL ENAMELING AND STAMPING COMPANY, INC., OF MILWAUKEE, WISCONSIN

RECEPTACLE ATTACHMENT

Application filed July 19, 1929. Serial No. 379,542.

This invention relates to receptacle attachments and more particularly to an attachment for spouted receptacles which are especially adapted for use in filling automobile radiators.

One of the objects of my invention is the provision of a reinforcing attachment adapted to be applied to the outer end of a spout on a receptacle which is used particularly for filling automobile radiators whereby the attachment not only forms a reinforcement for the outer end of the spout but provides a suitable support or rest for the outer end of the spout and is adapted to rest on the filling cap while the radiator is being filled.

Another object of the invention is the provision of an attachment to be applied to the discharge spout of a receptacle whereby to not only form a support for the spout when filling receptacles through the inlet neck thereof, but also provides protection for the outer end of the spout and reinforces the spout at the outer end thereof where the restricted discharge opening extends at an angle to the main spout.

With the above and other objects in view, the invention consists in the novel features of construction, the combination and arrangement of parts hereinafter more fully set forth, pointed out in the claims and shown in the accompanying drawings wherein:

Figure 1 is a perspective view of a receptacle illustrating the application of my invention;

Figure 2 is a detail section, illustrating the use of the invention; and

Figure 3 is a detail section on the line 3—3 of Figure 2.

Referring more particularly to the drawings, it will be noted that I have illustrated a receptacle 1, which may be of any size or design and is provided with the usual handle 2 for transporting and supporting the receptacle, and is also provided with the usual hand grip 3 which is used when emptying the contents of the receptacle.

Extending outwardly from one side of the receptacle at an incline with respect thereto is a spout 4 tapering toward its outer end and provided with a lateral extension 5. This type of receptacle is sold upon the market particularly for use in filling automobile radiators and is not only used at service stations, garages and similar places, but is used equally as well in the home, and a great deal of trouble has been experienced in protecting the lateral projection 5 so that it will not become detached from the main portion of the spout, and in view thereof, I have provided my improved detachment, which not only reinforces the spout at the junction between the lateral extension and the main body of the spout, but serves as a support for the spout when filling an automobile radiator or similar receptacle, as shown in Figure 2.

The attachment comprises a single piece of material substantially oval-shaped in design and formed with a central opening 6, adapted to receive the lateral extension 5 of the spout. The inner end of the oval-shaped device is bent around the outer end of the spout 4, as shown in Figure 3, to securely embrace the spout at this point, and if found desirable, may be soldered in position at the inner end of the oval-shaped body.

As the opening 6 in the body 7 is approximately located at a central point, one end of the body 7 extends substantially half of its length beyond the extension 5, as shown in Figure 2, whereby the entire device will form a suitable support for the spout in filling different sized openings. It will be apparent from the showing in Figure 2, that the device is sufficiently large to support the spout upon different sized filling necks or other inlets.

In forming the attachment, it is stamped from a single piece of material with the opening 6 stamped centrally thereof. The device is then applied to the extension 5 and the inner end of the body 7 bent around the smaller end of the spout 4 to conform to the shape thereof, as shown in Figures 1 and 3. The inner end of the body is soldered to the spout 4 in order to assist in retaining the device in operative position at all times.

It will be apparent from the foregoing that I have provided a simple and inexpensive attachment for receptacles which are especially adapted for use in filling automobile radiators, although the limited use of the receptacle is not essential. The device is extremely simple in construction and can be secured in position in a very short space of time and is extremely efficient in not only reinforcing the discharge spout of the receptacle but serves a very useful purpose in supporting the outer end of the spout when filling receptacles of different characters.

While I have shown and described the preferred embodiment of my invention, it will be apparent that slight changes may be made in the construction when putting the invention into practice without departing from the spirit of the same or the scope of the appended claims.

I claim:

1. In combination with a spout of a receptable having a lateral extension, of an oval shaped body having a central opening to receive the lateral extension with one end of the body embracing the spout and the other end projecting beyond the lateral extension and in alignment with the spout.

2. In combination with a spout of a receptacle having a lateral extension, of a sheet metal body having a central opening to receive the lateral extension with one end of the body embracing the spout and the other end projecting beyond the lateral extension and in alignment with the spout.

3. In combination with a spout of a receptacle having a lateral extension, of a sheet metal body transversely curved and formed with an opening intermediate its ends to receive the lateral extension with one end of the body embracing the spout and the other end projecting beyond the lateral extension and in alignment with the spout.

In testimony that I claim the foregoing I have hereunto set my hand at Milwaukee in the county of Milwaukee, and State of Wisconsin.

ALEXANDER C. SLADKY.